May 10, 1927. 1,628,260
J. H. MAXIM
POWER TRANSMISSION UNIT
Filed Oct. 27, 1926 2 Sheets-Sheet 2

Inventor:
Jesse H. Maxim
by Ralph W. Foster
atty.

Patented May 10, 1927.

UNITED STATES PATENT OFFICE.

1,628,260

JESSE H. MAXIM, OF EVERETT, MASSACHUSETTS.

POWER-TRANSMISSION UNIT.

Application filed October 27, 1926. Serial No. 144,439.

This invention relates to power transmission mechanism and its object is to provide for transmitting power from a given source to any desired point, which point may, within limits, be changed at will, without changing the source of the power.

The invention is particularly adapted for use with elevators and conveyors of the endless belt type employed in carrying coal, stone, grain and other materials; and for use with power driven vehicles.

Figure 1:
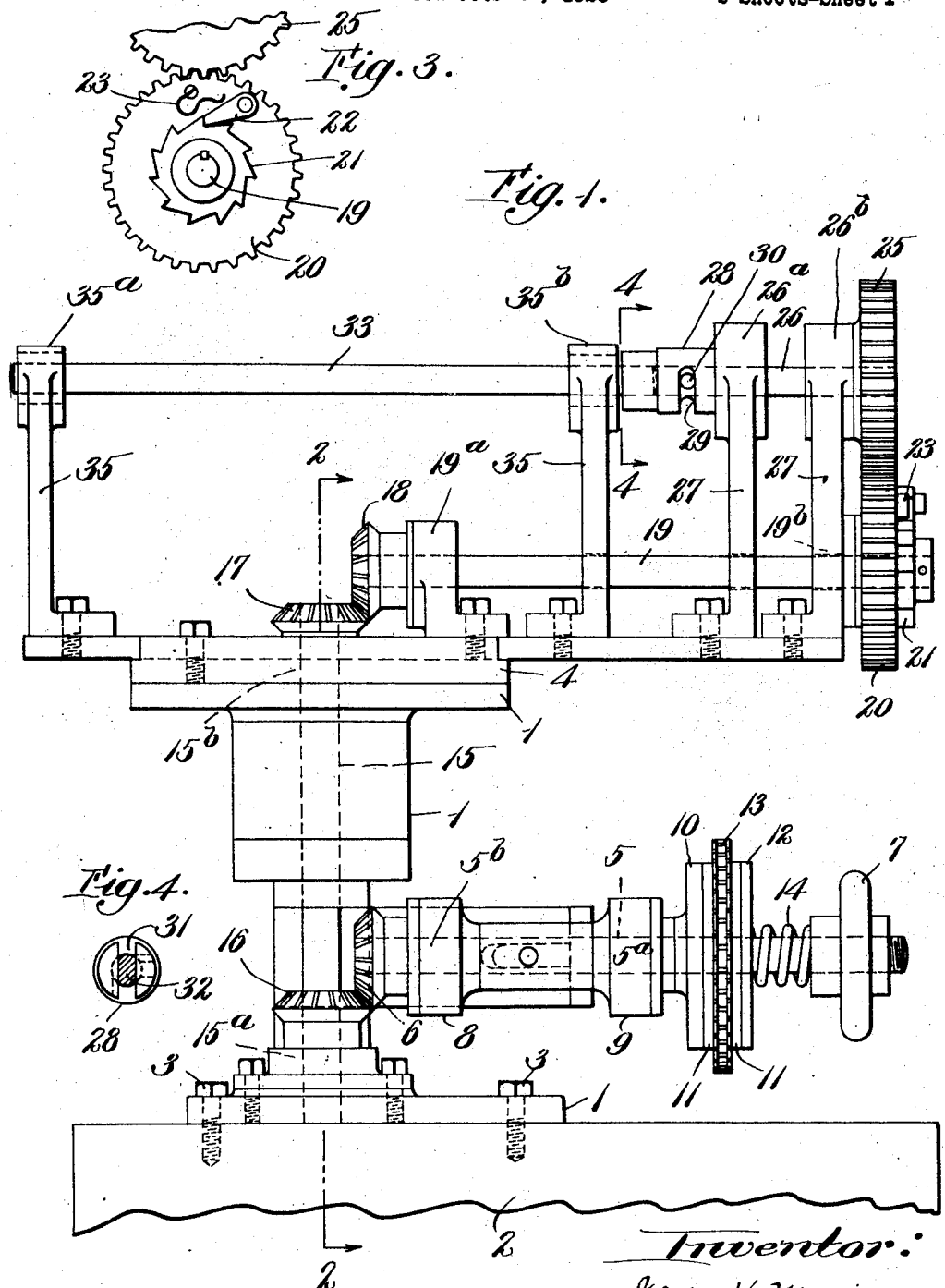
Figure 2:
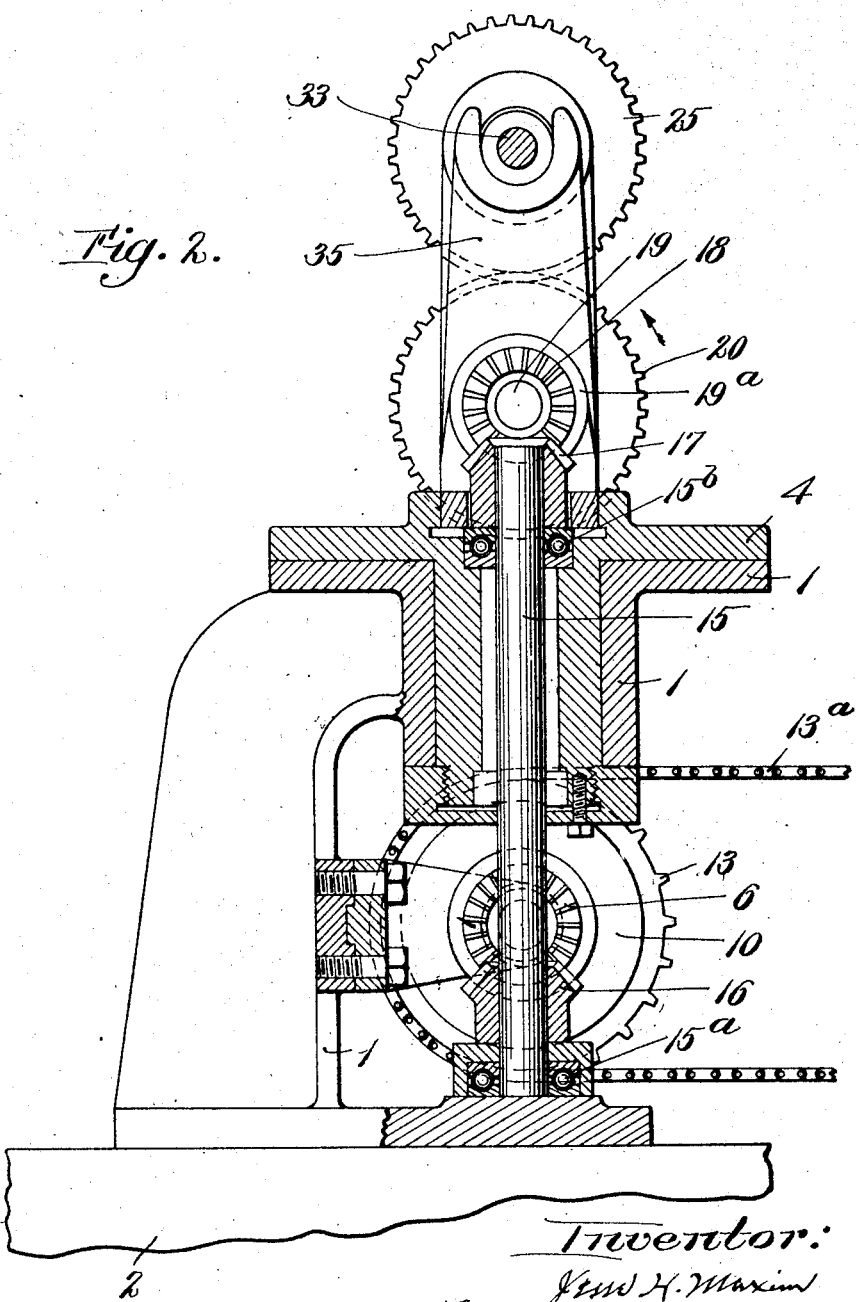

The invention is illustrated by the accompanying drawings in which: Figure 1 is a front elevation of the machine; Fig. 2 is an enlarged section on the line 2—2 Fig. 1, showing portions of the machine in elevation; Fig. 3 is a detailed view of the ratchet; and Fig. 4 is a detailed view partly in section on line 4—4 Fig. 1, showing the driving clutch.

The various parts of the machine are mounted on the frame 1, fastened to the floor (or other support), 2, by bolts 3 and surmounted by the turret 4 rotatively disposed thereon.

The shaft 5, horizontally disposed in bearings 5ª, 5ᵇ in the frame, is furnished on its inner end with the bevel gear 6 and has its outer end threaded for engagement by the hand nut 7.

On shaft 5 are adjustably disposed the ball bearing housings 8 and 9; the annular metal plate 10; the annular leather, friction discs 11; the annular metal plate 12; the sprocket 13; the hand nut 7; and the pressure controlling spring 14; the sprocket being disposed between the friction discs and being engaged by the sprocket chain 13ª leading to the source of power supply (not shown); all so related and disposed as to provide for frictionally holding the sprocket fixedly on said shaft under any predetermined pressure.

The shaft 15, vertically disposed in bearings 15ª, 15ᵇ in the frame, is furnished on its lower end with bevel gear 16, engaged by bevel gear 6, and on its upper end with bevel gear 17, which engages bevel gear 18 disposed on the inner end of shaft 19, which is horizontally disposed in bearings 19ª, 19ᵇ in the turret 4.

The shaft 19 is furnished on its outer end with gear 20 loosely mounted thereon, which gear is limited in its rotation to the direction indicated by the arrow (Fig. 2) by the ratchet 21 keyed on said shaft 19 and controlled by pawl 22 pivoted to the gear 20 and controlled in turn by spring 23 mounted on said gear.

The gear 20 engages gear 25 fixed on the outer end of shaft 26 horizontally disposed above and parallel to shaft 19 in bearings 26ª, 26ᵇ on the upper end of vertical supports 27, projected from the turret 4.

On the inner end of shaft 26 is mounted the sleeve 28 circumferentially slotted at 29 to receive pin 30 affixed to shaft 26, the inner end of the sleeve 28 being slotted at 31 to receive the flattened portion 32 of shaft 33; thereby forming a clutch mechanism.

The supports 35 are vertically projected from the turret 4 in alignment with the similar supports 27 and their upper ends 35ª, 35ᵇ provide bearings for the axial shaft 33 of an elevator, or conveyor of the endless belt type (not shown).

The mechanism is preferably of such proportions that it may conveniently be placed upon a shelf, or support projected from the side or end of a motor truck, or other vehicle (not shown).

The flexible sprocket chain is connected with the source of power, as, for example, the motor of a truck (not shown).

In the mechanism described the turret may be completely rotated, thus bringing the bearings carried thereby beneath the ends of the shaft 33 and said shaft may then be lowered into said bearings, being fixedly held therein by the clutch mechanism above described.

By this device one is enabled to unload a truck or other vehicle easily and quickly. Danger from sudden stopping of the conveyor, or elevator is avoided by employing the frictionally gripped sprocket 13 described.

The conveyor shaft, when dropped into the bearings in the supports 35 and into the clutch mechanism is fixedly held therein; but the parts are so proportioned and related as to permit the conveyor shaft 33 to be rotated vertically through an angle of 210° and to turn with the turret.

I claim—

1. A power transmission unit comprising, in combination, a frame; a rotary turret surmounting the frame; a rotary shaft horizontally disposed on the frame and furnished on its outer end with a frictionally engaged, spring-controlled sprocket; a second rotary shaft horizontally disposed on the turret and furnished on its outer end with a gear loosely mounted thereon and driven by a spring controlled pawl and ratchet affixed to the outer end of the shaft; a third rotary shaft horizontally disposed on the turret above and parallel to the second shaft above mentioned and furnished on its outer end with a gear affixed thereto and engaged by the gear on said second shaft; a vertically disposed rotary shaft operatively connecting the inner ends of the first and second mentioned shafts; bearings on the turret in axial alignment with the third shaft mentioned for receiving and holding an additional shaft; and a clutch on the inner end of the third shaft for grasping and holding an end of such additional shaft, and having a part of one independent rotation on said third shaft.

2. A power transmission unit comprising, in combination, a frame; a rotary turret surmounting the frame; a rotary shaft disposed on the frame and having one end furnished with a gear frictionally held thereon and adapted to rotate therewith under predetermined pressure; a second rotary gear disposed on the turret and furnished on one end with a gear and on the other end with a clutch adapted to receive and hold the end of an additional shaft; bearings on the turret for such additional shaft; and intermediate mechanism operatively connecting the first mentioned shaft with the second mentioned shaft.

3. A power transmission unit comprising, in combination, a frame; a rotary turret surmounting the frame; a rotary shaft disposed on the frame and having one end furnished with a gear; a second rotary shaft disposed on the turret and furnished on one end with a gear and having its other end adapted to receive and hold the end of an additional shaft; bearings on the turret for such additional shaft; and intermediate mechanism operatively connecting the first mentioned shaft with the second mentioned shaft.

JESSE H. MAXIM.